US011922472B1

(12) United States Patent
Hecht

(10) Patent No.: US 11,922,472 B1
(45) Date of Patent: Mar. 5, 2024

(54) SYSTEMS AND METHODS FOR TRANSFERRING A GIFT USING AN INFORMATION STORAGE AND COMMUNICATION SYSTEM

(71) Applicant: Wells Fargo Bank, N.A., San Francisco, CA (US)

(72) Inventor: Al Hecht, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 262 days.

(21) Appl. No.: 17/170,656

(22) Filed: Feb. 8, 2021

Related U.S. Application Data

(60) Continuation of application No. 16/538,476, filed on Aug. 12, 2019, now Pat. No. 10,915,937, which is a division of application No. 14/195,145, filed on Mar. 3, 2014, now Pat. No. 10,387,928.

(60) Provisional application No. 61/922,449, filed on Dec. 31, 2013, provisional application No. 61/806,686, filed on Mar. 29, 2013.

(51) Int. Cl.
| | |
|---|---|
| *G06Q 30/0601* | (2023.01) |
| *B42D 25/20* | (2014.01) |
| *G06Q 20/34* | (2012.01) |
| *G06Q 20/36* | (2012.01) |

(52) U.S. Cl.
CPC ....... *G06Q 30/0601* (2013.01); *B42D 25/285* (2014.10); *G06Q 20/342* (2013.01); *G06Q 20/36* (2013.01); *G06Q 20/363* (2013.01)

(58) Field of Classification Search
CPC .. G06Q 30/0601; G06Q 20/342; G06Q 20/36; B42D 25/285
See application file for complete search history.

(56) References Cited

U.S. PATENT DOCUMENTS

| | | | |
|---|---|---|---|
| 5,521,815 | A | 5/1996 | Rose, Jr. |
| 5,978,774 | A | 11/1999 | Rogers et al. |
| 6,085,172 | A | 7/2000 | Junger |
| 6,587,835 | B1 | 7/2003 | Treyz et al. |
| 6,850,902 | B1 | 2/2005 | Finch |
| 6,898,598 | B2 | 5/2005 | Himmel et al. |

(Continued)

OTHER PUBLICATIONS

"Use AutoFill for credit cards, contacts, and passwords"; https://support.apple.com/guide/safari/use-autofill-ibrw1103; 2018. 2 pages.

(Continued)

*Primary Examiner* — Ramsey Refai
(74) *Attorney, Agent, or Firm* — Foley & Lardner LLP

(57) ABSTRACT

Systems and methods for using an information wallet system to deliver a gift and receive, redeem, or re-gift the gift are disclosed. The information wallet system's storage is securely maintained by a financial institution computing system (i.e. a bank) and receives and holds purchase transaction information. Purchase information transaction may be received from a user computing device or an entity computing system, such as a merchant computing system. In one embodiment, a user may purchase a gift through an online website or at a brick and mortar location and direct the gift to be deposited into the information wallet storage of a recipient. A recipient may then continue to hold the gift, redeem the gift, or re-gift the gift to another party.

11 Claims, 9 Drawing Sheets

(56) References Cited

U.S. PATENT DOCUMENTS

| | | |
|---|---|---|
| 6,912,507 B1 | 6/2005 | Phillips et al. |
| 6,934,686 B1 | 8/2005 | Rajagopalan |
| 7,099,850 B1 | 8/2006 | Mann et al. |
| 7,162,451 B2 | 1/2007 | Berger et al. |
| 7,266,533 B2 | 9/2007 | Karas et al. |
| 7,343,551 B1 | 3/2008 | Bourdev |
| 7,689,508 B2 | 3/2010 | Davis et al. |
| 7,766,223 B1 | 8/2010 | Mello et al. |
| 7,778,934 B2 | 8/2010 | Graves et al. |
| 7,822,065 B2 | 10/2010 | Lu |
| 7,991,652 B2 | 8/2011 | Chamberlain |
| 8,117,444 B2 | 2/2012 | Takatori et al. |
| 8,121,983 B2 | 2/2012 | Prahlad et al. |
| 8,260,806 B2 | 9/2012 | Steele et al. |
| 8,452,654 B1 | 5/2013 | Wooters et al. |
| 8,583,549 B1 | 11/2013 | Mohsenzadeh |
| 8,606,640 B2 | 12/2013 | Brody et al. |
| 8,612,349 B1 | 12/2013 | Ledder et al. |
| 8,646,060 B1 | 2/2014 | Ben Ayed |
| 8,825,757 B2 | 9/2014 | Lunt et al. |
| 8,977,408 B1 | 3/2015 | Cazanas et al. |
| 9,292,484 B1 | 3/2016 | Plow et al. |
| 10,037,561 B1 | 7/2018 | Hecht |
| 10,217,108 B1 | 2/2019 | Hecht |
| 10,572,725 B1 | 2/2020 | Becker et al. |
| 2001/0053980 A1 | 12/2001 | Suliman et al. |
| 2002/0179704 A1 | 12/2002 | Deaton |
| 2003/0028427 A1 | 2/2003 | Dutta et al. |
| 2003/0074265 A1* | 4/2003 | Oshima ............... G06Q 30/06 705/26.1 |
| 2003/0130907 A1 | 7/2003 | Karas et al. |
| 2004/0122685 A1 | 6/2004 | Bunce |
| 2005/0033650 A1* | 2/2005 | Robertson ............ G06Q 30/02 705/26.8 |
| 2005/0097320 A1 | 5/2005 | Golan et al. |
| 2005/0210263 A1 | 9/2005 | Levas et al. |
| 2005/0250538 A1 | 11/2005 | Narasimhan et al. |
| 2006/0179404 A1 | 8/2006 | Yolleck et al. |
| 2006/0208065 A1 | 9/2006 | Mendelovich et al. |
| 2006/0259380 A1 | 11/2006 | Milstein et al. |
| 2007/0162338 A1 | 7/2007 | Lawe |
| 2007/0168175 A1 | 7/2007 | Fux et al. |
| 2007/0255564 A1 | 11/2007 | Yee et al. |
| 2008/0010298 A1 | 1/2008 | Steele et al. |
| 2008/0052184 A1 | 2/2008 | Junger et al. |
| 2008/0071627 A1 | 3/2008 | Junger |
| 2008/0117966 A1 | 5/2008 | Topiwala et al. |
| 2009/0006646 A1 | 1/2009 | Duarte |
| 2009/0076966 A1 | 3/2009 | Bishop et al. |
| 2009/0083847 A1 | 3/2009 | Fadell et al. |
| 2009/0132392 A1 | 5/2009 | Davis et al. |
| 2009/0132415 A1 | 5/2009 | Davis et al. |
| 2009/0234764 A1 | 9/2009 | Friesen |
| 2009/0288012 A1 | 11/2009 | Hertel et al. |
| 2010/0005034 A1 | 1/2010 | Carpenter et al. |
| 2010/0030578 A1 | 2/2010 | Siddique et al. |
| 2010/0137008 A1 | 6/2010 | Li et al. |
| 2010/0191570 A1 | 7/2010 | Michaud et al. |
| 2010/0205091 A1 | 8/2010 | Graziano et al. |
| 2010/0250364 A1 | 9/2010 | Song et al. |
| 2011/0004921 A1 | 1/2011 | Homer et al. |
| 2011/0020130 A1 | 1/2011 | Murakami et al. |
| 2011/0022483 A1 | 1/2011 | Hammad |
| 2011/0022681 A1 | 1/2011 | Simeonov |
| 2011/0035788 A1 | 2/2011 | White et al. |
| 2011/0106698 A1 | 5/2011 | Isaacson et al. |
| 2011/0179061 A1 | 7/2011 | Chilakamarri et al. |
| 2011/0201306 A1 | 8/2011 | Ali Al-Harbi |
| 2011/0276478 A1 | 11/2011 | Hirson et al. |
| 2011/0307375 A1 | 12/2011 | Maney |
| 2012/0022944 A1 | 1/2012 | Volpi |
| 2012/0041877 A1 | 2/2012 | Rao |
| 2012/0066262 A1 | 3/2012 | Greenberg |
| 2012/0095855 A1 | 4/2012 | Sterling |
| 2012/0150643 A1 | 6/2012 | Wolfe et al. |
| 2012/0150731 A1* | 6/2012 | Isaacson ............... G06Q 30/06 705/39 |
| 2012/0150743 A1 | 6/2012 | Isaacson et al. |
| 2012/0179325 A1 | 7/2012 | Faenger |
| 2012/0191615 A1 | 7/2012 | Schibuk |
| 2012/0203750 A1 | 8/2012 | Vaananen |
| 2012/0239581 A1 | 9/2012 | Mosher |
| 2012/0271712 A1 | 10/2012 | Katzin et al. |
| 2013/0013512 A1 | 1/2013 | Cloud et al. |
| 2013/0024327 A1 | 1/2013 | Nargizian |
| 2013/0030934 A1 | 1/2013 | Bakshi et al. |
| 2013/0073365 A1 | 3/2013 | McCarthy |
| 2013/0080289 A1 | 3/2013 | Roy et al. |
| 2013/0110639 A1 | 5/2013 | So et al. |
| 2013/0117087 A1 | 5/2013 | Coppinger |
| 2013/0132219 A1* | 5/2013 | Liberty ............... G06Q 20/202 705/41 |
| 2013/0198598 A1 | 8/2013 | Kirsch |
| 2013/0246258 A1 | 9/2013 | Dessert |
| 2013/0325588 A1 | 12/2013 | Kalyanam et al. |
| 2013/0332342 A1 | 12/2013 | Kasower |
| 2013/0332826 A1 | 12/2013 | Karunamuni et al. |
| 2013/0340052 A1 | 12/2013 | Jakobsson |
| 2014/0067564 A1 | 3/2014 | Yuan |
| 2014/0164082 A1 | 6/2014 | Sun et al. |
| 2014/0214626 A1 | 7/2014 | Bowers et al. |
| 2014/0229375 A1 | 8/2014 | Zaytzsev et al. |
| 2014/0244365 A1 | 8/2014 | Price et al. |
| 2014/0244487 A1 | 8/2014 | Seligmann et al. |
| 2014/0379521 A1 | 12/2014 | Novotny et al. |
| 2015/0052064 A1 | 2/2015 | Karpenko et al. |
| 2015/0088337 A1 | 3/2015 | Toohy et al. |
| 2015/0128241 A1 | 5/2015 | Jakobsson |
| 2015/0220924 A1 | 8/2015 | Bakker |
| 2015/0248664 A1 | 9/2015 | Makhdumi et al. |
| 2015/0339652 A1 | 11/2015 | Park et al. |
| 2015/0356562 A1 | 12/2015 | Siddens et al. |
| 2016/0062972 A1 | 3/2016 | Ramakrishnan et al. |
| 2016/0203213 A1 | 7/2016 | Lewis et al. |
| 2016/0239887 A1 | 8/2016 | Zhao et al. |
| 2017/0262421 A1 | 9/2017 | Yue |
| 2018/0181866 A1 | 6/2018 | Dalle et al. |
| 2018/0314711 A1 | 11/2018 | Botner et al. |
| 2019/0108909 A1 | 4/2019 | Lee et al. |

OTHER PUBLICATIONS

Corcoran, Cate T., "Caught In A Cloud: Technology Revolution Reinventing Retail" WWD: Women's Wear Daily; Los Angeles vol. 199, Iss. 13 (Jan. 20, 2010): 1. (Year: 2010. 4 pages.

Dashlane; "Never forget another password"; https://www.dashlane.com/;2018. 8 pages.

Dashlane; "The most accurate way to autofill forms on the web"; https://www.dashlane.com/features/autofill; 2018. 8 pages.

Gaunt, Matt; "Deep Dive into the Payment Request API"; https://developers.google.com/web/fundamentals/payments/deep-dive-into-payment-request; Jan. 9, 2018. 53 pages.

McCormick, Jeff; "Payment Request API"; https://docs.microsoft.com/en-us/microsoft-edge/dev-guide/device/payment-request-api; May 24, 2017. 7 pages.

Desai et al., E-commerce policies and customer privacy: a longitudinal study, Information Management & Computer Security, vol. 20, No. 3, pp. 222-244, Emerald Group Publishing Limited (2012) (Year: 2012).

Steven Castle, LG Smart Fridge Knows Your Grocery List, Electronic House, Jan. 11, 2012 (4 pages).

* cited by examiner

SYSTEMS AND METHODS FOR TRANSFERRING A GIFT USING AN INFORMATION STORAGE AND COMMUNICATION SYSTEM

CROSS-REFERENCE TO RELATED PATENT APPLICATIONS

This application is a continuation of U.S. patent application Ser. No. 16/538,476 entitled "Systems and Methods for Transferring a Gift Using an Information Storage and Communication System," and filed Aug. 12, 2019, which is a divisional of U.S. patent application Ser. No. 14/195,145 (now U.S. Pat. No. 10,387,928) entitled "Systems and Methods for Transferring a Gift Using an Information Storage and Communication System" and filed on Mar. 3, 2014, which claims priority to U.S. Provisional Patent Application No. 61/806,686 entitled "Systems and Methods for Information Storage and Communication" and filed on Mar. 29, 2013, and U.S. Provisional Patent Application No. 61/922,449 entitled "Systems and Methods for Transferring a Gift Using an Information Storage and Communication System" and filed on Dec. 31, 2013, the disclosures of which are hereby incorporated by reference in their entireties.

BACKGROUND OF THE INVENTION

Individuals are often asked to provide information in connection with receiving various goods or services. For example, individuals are often asked to fill out an online registration form when registering for a website. Oftentimes, the information that the individual is asked to provide is the same or similar to information that the individual has been asked to provide previously. Individuals may in effect be asked to provide the same information over and over again to different entities. For example, when ordering gifts for friends or relatives through various websites, the individual may be requested to provide identifying information for the friends and relatives at each website. In some cases, in the course of receiving the good or service, the individual may also receive additional information that the individual would like to access at a future date, such as warranty information in connection with goods purchased online. Also, individuals may desire to purchase and transfer gifts to other individuals using safe, reliable systems. Enhanced systems and methods of facilitating such information transactions would be desirable.

SUMMARY OF THE INVENTION

One embodiment of the disclosure relates to a computer-implemented information wallet system for electronic gift delivery. The system comprises a financial institution computing system, the computing system comprising a processor and machine readable media having instructions stored therein that, when executed by the processor, configure the financial institution computing system to receive purchase transaction information from a merchant computing system. The merchant computing system has an information wallet adapter, and the purchase transaction information received by the financial institution computing system comprises information related to a gift. The financial institution computing system further includes account management logic configured to manage accounts respectively associated with a plurality of users, the accounts including bank accounts and information wallet accounts. The financial institution computing system also includes a transaction processor configured to permit users to perform transactions using funds, including funds from a bank account held by a user, wherein the transactions include depositing gifts into information wallet accounts, transferring gifts to separate information wallet accounts, and redeeming gifts from information wallet accounts. The financial institution computing system further includes a cloud storage computing system configured to communicate with a plurality of information wallet adapters and to manage the information wallet accounts within the cloud storage computing system. The cloud storage computer system is further configured to receive the purchase transaction information, wherein the purchase transaction information further comprises a gift, and wherein the information wallet system stores the gift information over a period of time for the gift to be redeemed.

Another embodiment of the disclosure relates to a method for electronically delivering a gift through an information wallet system comprising connecting with a plurality of third-party computing systems having information wallet adapters. The method further includes receiving purchase transaction information into the information wallet computing system, the purchase transaction information being transmitted from information wallet adapters located within the plurality of third-party computing systems. The method also includes storing the purchase transaction information in a cloud storage computing system configured to manage the purchase transaction information, receive the purchase transaction information, retrieve purchase transaction information, and enforce security settings of the purchase transaction information transferring in and out of the cloud storage computing system, wherein the purchase transaction information further comprises a gift, which a recipient's information wallet account stores over a period of time for the gift to be redeemed or re-gifted. The method further comprises depositing the purchase transaction information into an information wallet account maintained by the cloud storage computing system.

A further embodiment of the disclosure relates to a method for delivering a gift comprising authenticating a purchaser accessing a third-party computing system through an information wallet application located on a user computing device. The method further comprises displaying a catalog of products on the user computing device through the third-party computing system to offer an item for sale and collecting payment through the user computing device for the purchase of the item. The method also comprises receiving instructions from the purchaser to deliver a gift representing the item to a recipient holding an information wallet account at a financial institution and connecting with a financial institution computing system using an information wallet adapter. The method additionally comprises sending information through the information wallet adapter into the information wallet computing system of the financial institution computing system, the information wallet computing system determining the information wallet account of the recipient and depositing the gift into the information wallet account maintained by a cloud storage computing system within the financial institution computing system.

DETAILED DESCRIPTION OF THE PREFERRED EMBODIMENTS

The systems and methods, described in greater detail below, provide an information wallet system configured to receive information from a user and enable the user to communicate the information in a highly secure, convenient, efficient, time-saving, and cost-effective manner. The systems and methods may allow merchants and other businesses to reduce their reliance on technologies such as card swipe, card readers, cash machines, custom kiosks, cash registers, specialized scanners, etc. The information may be stored in the cloud and/or locally on the customer's device. In some arrangements, the information may be stored at an external storage system associated with another entity. A token may link data stored at the external storage system to the information wallet such that the information may be accessed by the information wallet system. The information may also be stored in a financial institution computing system maintained by the financial institution. The information may be accessible to the individual and other entities, with the approval of the user, using a mobile device (i.e. laptop, mobile phone, tablet, portable gaming device, and portable electronic device) or other computing devices (i.e. desktop computer).

Figure 1:
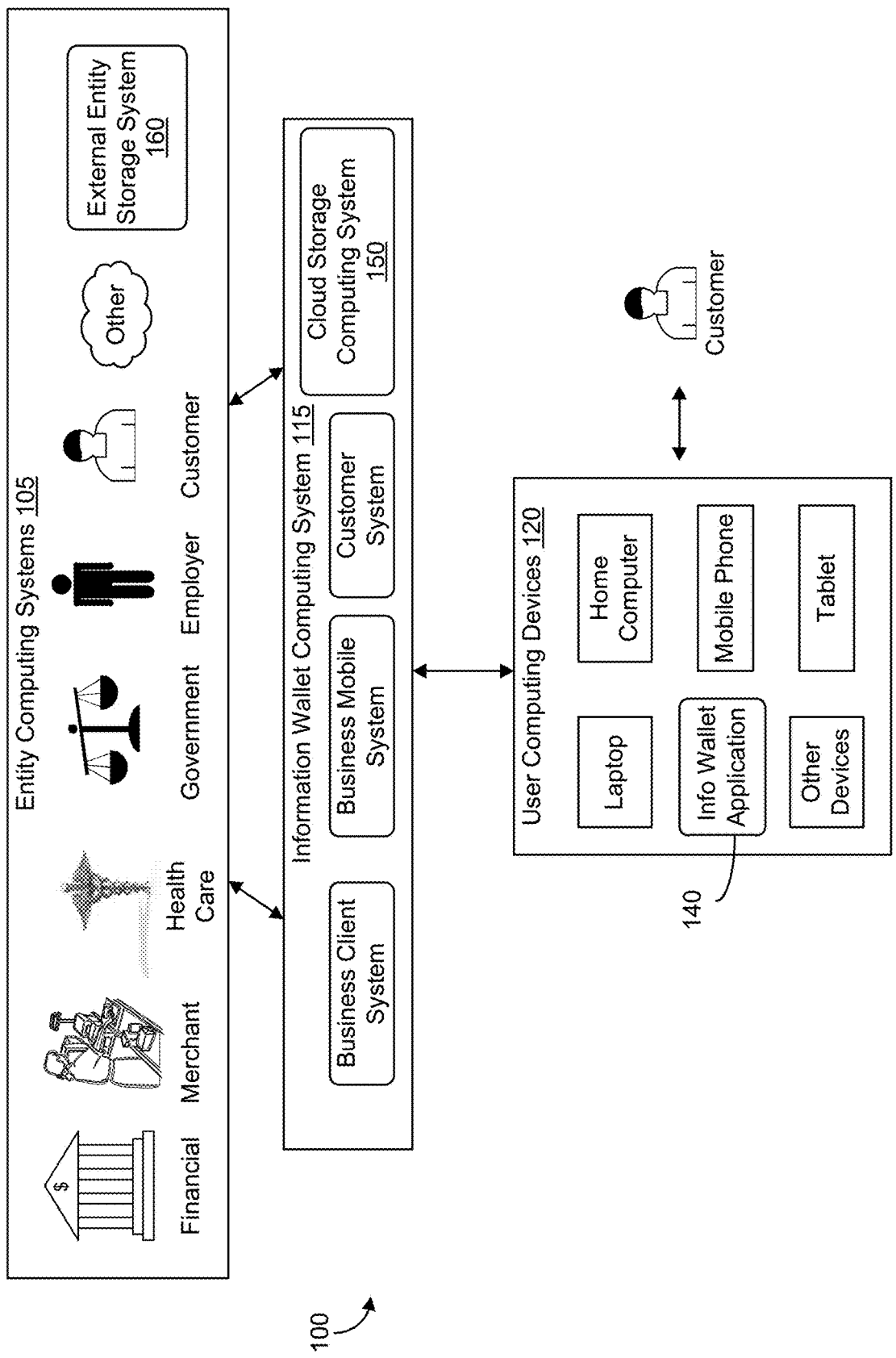
FIG. 1 is a schematic diagram of a computer-implemented information wallet system according to an example embodiment.
Figure 2:
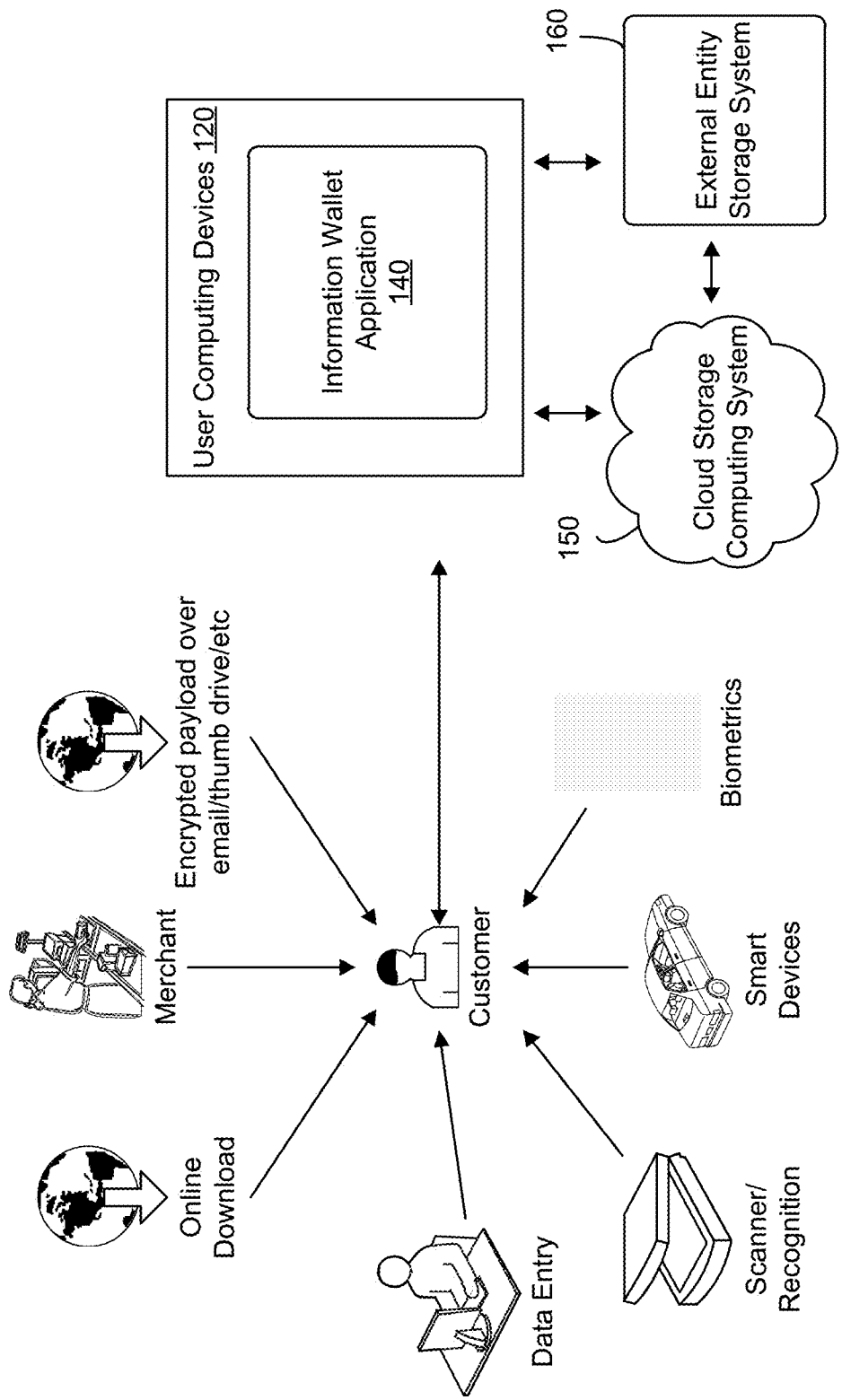
FIG. 2 is a schematic diagram of a computer-implemented information receiving system of the information wallet system in FIG. 1 according to an example embodiment.
Figure 3:
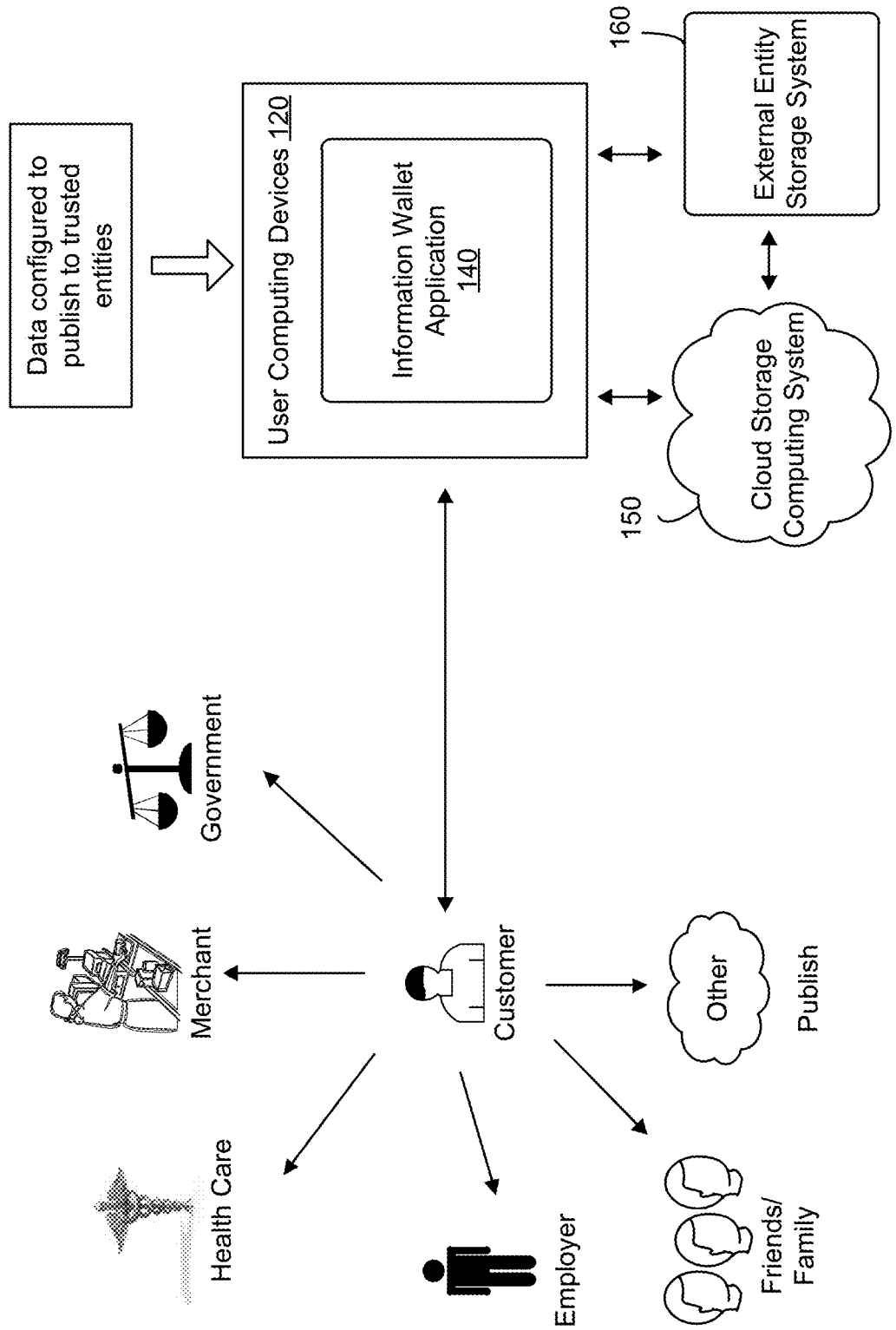
FIG. 3 is a schematic diagram of a computer-implemented information sharing system of the information wallet system of FIG. 1 according to an example embodiment.
Figure 5:
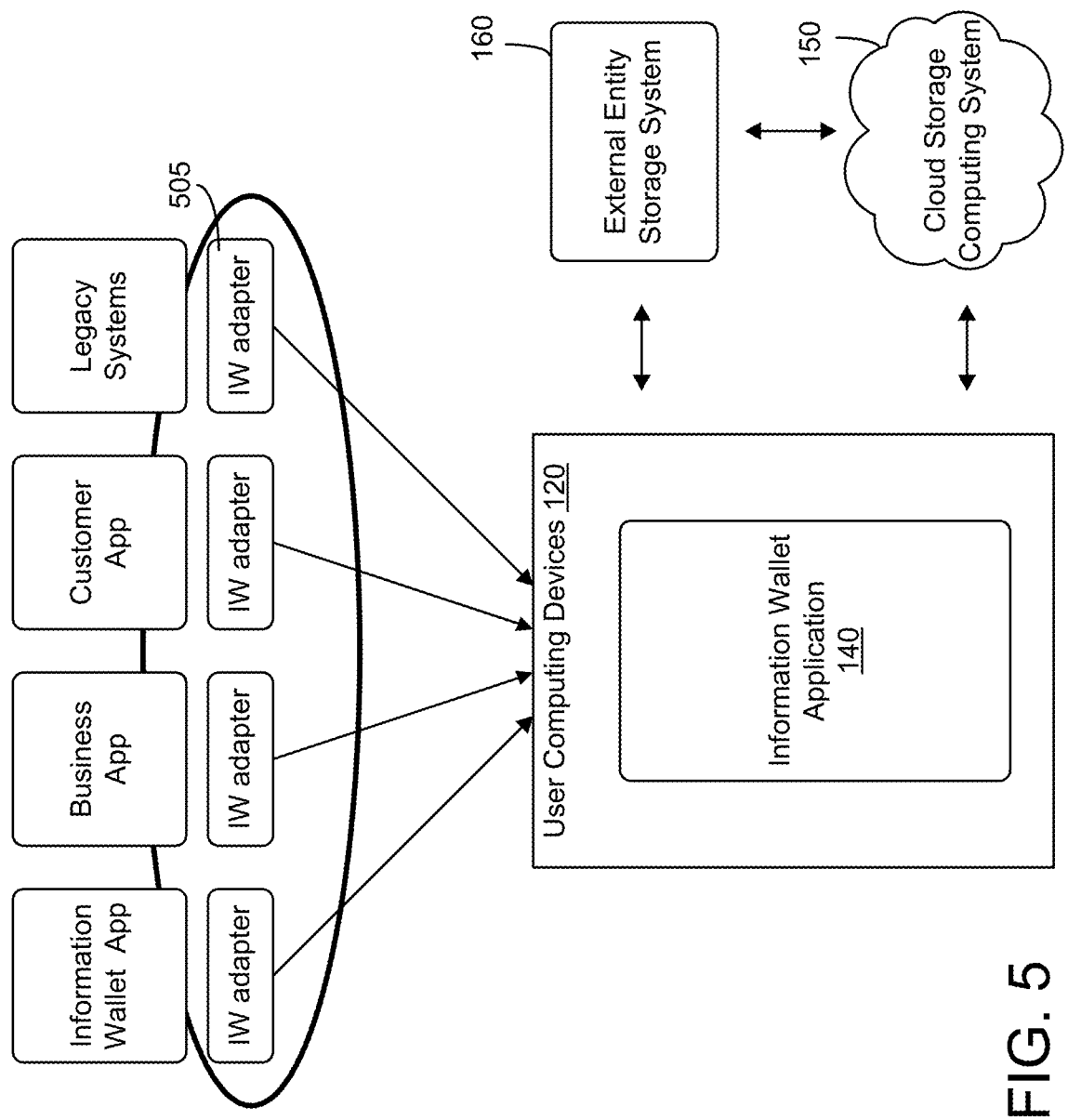
FIG. 5 is a diagram showing information synchronization between various adapters and user applications according to an example embodiment.

Referring to FIG. 1, a computer-implemented information wallet system 100 is shown that may be used by a customer (also referred throughout as a user) to set up and utilize an information wallet account using a user computing device 120 (i.e. laptop, mobile phone, tablet, or home computer). In the various embodiments, data storage and other functionality for the information wallet system 100 may include a cloud-based storage computing system 150 and/or other functionality provided by the information wallet computing system 115. The information wallet computing system 115, in one example embodiment, may be provided a financial institution computing system (e.g., a bank computing system). The user may be an individual consumer that may have one or more accounts with the financial institution and has also established an information wallet account with the financial institution. In another embodiment, the user may not have a financial account with the financial institution but may nevertheless have established an information wallet account with the financial institution. The information wallet system 100 is configured to meet the varied needs of users in the embodiments above and embodiments discussed below. In other embodiments, the information wallet system 100 may be provided by other entity computing systems 105. Other entity computing systems may comprise a second financial institution, a merchant, a health care organization, a government organization, an employer, a customer, or other entity with a computing system. The other entity computing systems 105 may store data that is accessed by the information wallet system 100 (e.g., in external entity storage systems 160 as shown in FIGS. 2, 3, and 5). The information wallet system 100 may include a link out to the data stored in the other entity computing systems 105 such that the data stored by the other entity computing systems 105 is seamlessly accessed by the information wallet computing systems 115. The information wallet computing system 115 may be used to facilitate storing information and communicating stored information to one or more entities, potentially via a user computing device 120.

The financial institution may include a financial institution computing system. The computing system may include various storage, such as banking servers, configured to store data relating to a plurality of customer accounts, financial records, and other documents. The stored data may be backed up in multiple data centers, for example, data centers that are geographically diverse. The computing system may include account management logic (e.g., programming modules stored in a memory and configured to be executed by a processor, such as the processor of the banking server). The account management logic may be part of the banking servers or may reside on a separate server within the computing system. The account management logic perform any typical functions and transactions associated with managing and maintaining a bank account for a customer, including, but not limited to opening new accounts, closing existing accounts, crediting accounts, debiting accounts, transferring funds between accounts, processing debit and credit card transactions, calculating and applying interest, calculating balances, performing account transfers, processing electronic bill payment transactions, and the like. The account management logic may include transaction processing logic to perform the above recited tasks. The account management logic may be configured to manage a plurality of types of accounts, including but not limited to demand deposit accounts (e.g., checking accounts, savings accounts, etc.), credit card accounts, lines of credit, and the like. The financial institution computing system may include interface logic configured to connect the financial institution computing system to computing systems associated with the plurality of users by way of a communication network. The financial institution computing system may include import logic configured to import financial statements regarding the financial accounts on a scheduled basis and/or to import user-provided documents on a user-determined timing basis.

Referring to FIG. 1, information wallet system 100 may include, among other systems, entity computing systems 105 (i.e. a merchant computing system and/or a financial institution computing system), an information wallet computing systems 115, a user computing device 120 (which may include a laptop, home computer, mobile phone, tablet, or any other computing devices), and cloud storage computing systems 150. The computing systems and devices 105, 115, 120, and 150 may communicate through a cloud network, which may include one or more of the Internet, cellular network, near field communication (NFC), Bluetooth connection, Wi-Fi, Wi-Max, a proprietary banking network, etc. The entity computing systems 105, information wallet computing systems 115, user computing devices 120, and cloud storage computing systems 150 may each comprise a computer system (e.g., comprising one or more processors) configured to execute instructions, send and receive data stored in non-transitory memory, and perform other operations to implement the operations and functions described herein associated with logic or processes as shown in the figures and discussed throughout the disclosure.

The entity computing systems 105 are implemented by entities that interact to exchange information with users. Such entities, as described above, may include a financial institution, a merchant of goods or services, a health care organization, a government organization, an employer, a customer, or any other entity or combination of entities. The entity computing system 105 may, for example, be provided by any entity that provides goods or services to consumers. The entities may enter into transactions with the user and/or may exchange information with the user. For example, the entity computing systems 105 may implement an Internet destination (e.g., website) where users may obtain user names/login IDs or otherwise become registered members. Registration of the users as members could allow a user and entity to connect quickly and securely, determine and share a variety of relevant information, and optimize the shared information to meet both the user and entity needs. As another example, the entity computing systems 105 may be provided at a bricks and mortar location where the user receives goods or services, such as a store, a hospital, a restaurant, a hotel, etc. The information exchanged may, for example, relate to the goods or services received by the user at the location.

The user computing devices 120 may be used by a user to create an information wallet account and interact with an entity computing system 105. The user computing devices 120 may include mobile devices such as a smart phone, portable gaming device, portable music listening device, portable digital or electronic viewing device, or another suitable wireless device. The user computing device 120 may comprise network interface logic, a display device, an input device, and an information wallet application 140. Network interface logic may include, for example, program logic that connects the user computing device 120 to the network. As described in greater detail below, for example, the user computing device 120 may display screens to prompt the user to review and/or approve data transfer requests, to request data from the user, etc. Such screens may also be used to prompt the user to specify parameters regarding the level of security to be associated with different elements of data regarding the user. For example, data requests including a mailing or physical address may be assigned a higher level of security than data requests involving an email address. Such screens are presented to the user via the display device. The display device may be interactive, for example touchscreen. An input device may be used to permit the user to initiate access to the information wallet and to facilitate sending/receiving requested information to/from the entities. In one embodiment, the input device may allow a user to access and redeem a gift stored in the information wallet system 100.

FIG. 1 shows information wallet computing system 115 disposed between the entity computing systems 105 and the user computing devices 120. In one embodiment, the information wallet computing system 115 is resides within a financial institution computing system. The information wallet computing system 115 may comprise program logic executable by and between the entity computing systems 105 and the user computing devices 120 to implement at least some of the functions described herein. As will be appreciated, the level of functionality that resides on the entity computing systems 105 or information wallet computing system 115 as opposed to the user computing devices 120 may vary depending on the implementation. The information wallet computing system 115 may include modules such as a business client system, business mobile system, and customer system. The business client system module may provide the backend support of the information wallet application disposed on a business client side. Likewise, the business mobile system and customer system modules may provide backend support of the information wallet application disposed on a business mobile device or a customer device. The information wallet computing system 115 may also host the cloud storage computing system 150.

The information wallet computing system 115 may allow the user computing devices 120 to interact with entity computing systems 105. In one embodiment, the information wallet computing system 115 facilitates the exchange of information between the user computing device 120 and the entity computing device 105. For example, the information wallet computing system 115 may receive information from a user computing device 120 and transfer that information to the entity computing system 105. In one embodiment, the information received from the user computing device 120 corresponds with a request to the information wallet computing system 115 to retrieve certain information. The information wallet computing system 115 may receive the request, access the cloud storage computing system 150, retrieve the requested information, and forward the information as requested to the entity computing system 105. In another embodiment, the same process may apply for transferring information from an entity computing system 105 to the user. The information wallet computing system 115 may receive information from an entity computing system 105 and transfer that information to a user computing device 120. The information received may correspond with a request to the information wallet computing system 115 to retrieve certain information from the cloud storage computing system 150. The information wallet computing system 115 may receive the information including the request from the entity computing system 105, access the cloud storage computing system 150, retrieve the requested information, and transfer the information to the user computing device 120. For embodiments described throughout the disclosure, any user, customer, or entity may create an information wallet account through the information wallet system 100 using an available computing device.

The cloud storage computing system 150 may store information that is provided by the user, e.g., after the information wallet is enriched by one or more of the processes shown in FIG. 2, described below. The cloud storage computing system 150 may encrypt the data regarding the user. In some embodiments, the cloud storage computing system 150 may permit an entity to access the data based on a permission or security level granted by a user. For example, if a user configures an information wallet account to allow broad permission for sharing information about vehicles owned by the user, then an entity seeking the user's vehicle information may obtain that information without waiting for further approval. The entity may solicit the information from the cloud storage computing system 150 through the information wallet computing system 115, and the information wallet computing system 115 may retrieve the information based on pre-set permission by the user. The cloud storage computing system 150 may give the user full control of the information stored by the user in the cloud storage computing system 150. The system is configured such that a third-party computing system may only access information in conformance with permission and security levels set by a user.

Some of the user information may be stored in the external entity storage systems 160 of entities 105. Accordingly, some data may be stored outside of the cloud storage computing system 150 and the user computing devices 120. In these situations, the information wallet computing system 115 may include a link out to the data stored in the external entity storage systems 160. The link out may be a token that is stored in the cloud storage computing system 150 or in the information wallet application 140 running on the user computing devices 120. The link out indicates to the information wallet system 100 the location and content of the information stored the external entity storage systems 160 of entities 105 such that the data can be integrated into the user's information wallet without having to store the data in the information wallet computing system 115. For example, a user may opt not to store medical information (e.g., an MM, X-rays, etc.) in the information wallet computing system 115, but rather in a records database of the user's medical provider. In this situation, the information wallet computing system 115 may be configured with a link out to the medical information stored in the records database of the medical provider such that that the information wallet system 100 has access to the externally stored data.

In an example embodiment, the information wallet system 100 allows interoperability between various entity computing systems 105 (e.g., external entity storage systems 160), information wallet computing systems 115, user computing devices 120, and other relevant systems. In order to provide the interoperability with each of the above listed systems, various adapters may be utilized on a plurality of systems. Adapters facilitate integrating computing systems of different technological platforms in a manner that allows different computing systems to connect with the information wallet system 100. The adapters may be implemented, for example, using plug-ins or Application Program Interfaces ("APIs"), which comprise a set of software components that add specific abilities to a larger software application. The plug-ins or APIs, in one embodiment, adapt the pre-existing enterprise computing system to connect with the information wallet system 100. The plug-ins or APIs may also enable the functionality of an application to be customized, such as an enterprise application that supports business operations of a business entity or an application (e.g., browser) executed on a user computing device 120. The application may be customized to meet any need or requirement of any particular entity, business, or customer using the information wallet system 100. For example, a hotel may have enterprise software with a plug-in installed that displays a button screen (i.e. "Request via Info Wallet") in the check-in screen. Upon the engaging the button, such as by pressing the button, the enterprise software may execute the plug-in. The plug-in or APIs may, for example, initiate the generation of a Bluetooth signal to establish Bluetooth contact with a user computing device 120. A random PIN may be verbally or textually communicated to the user for entry into the user computing device 120 in order to initiate Bluetooth pairing with the user computing device 120 of the user. The plug-in or API may therefore, via Bluetooth, request information from the information wallet system 100 of the user that is checking into the hotel. In other scenarios, the connection may be made by way of another type of wireless connection, such as but not limited to, Wi-Fi, WAN, 3G, 4G, NFC, etc. The plug-ins or APIs or other adapters may use a request/response protocol to communicate messages and execute code. The plug-ins or APIs may send messages in a predetermined format that contain a list of data that is requested. The user computing device 120 may receive the Bluetooth request and generate a screen requesting permission to send the requested information. The adapters may also request certain packages of data. For example, if a common adapter is developed that is used by various hotels using the same enterprise software, then all hotels may ask for the same package of data, and that information may be standardized and prepackaged to be sent each hotel. As will be appreciated, similar arrangements may be implemented in other contexts (e.g., healthcare providers, merchants, etc.).

The cloud storage computing system 150 may cooperate with the information wallet computing system 115 on the user computing device 120 to provide different levels of security to the information stored in the cloud storage computing system 115. For example, the user may configure the information wallet to provide the address and phone number of the user with a first (relatively low) level of security, to provide a credit card number of the user with a second (higher) level of security, to provide the credit card cvv value with a third (still higher) level of security, and to provide the user's social security with a fourth (even higher) level of security. As will be appreciated, any number of different levels of security may be provided. The level of security given to any particular data element may be determined as a matter of default (e.g., information wallet configuration may by default dictate that the user's social security number is given a higher level of security than the user's phone number), based on user-specified inputs (e.g., the user may be given the ability to set security on a data element by data element basis, to set security for groups of related data (e.g. health data vs. financial data), and/or to set security in another manner), etc. The level of security assigned to a specific type of information or data may alter the steps that must be taken in order for the information wallet system to relinquish the information to a third-party computing system. For example, information and data with a relatively low level of security may be pre-approved for sharing by the user, and the information wallet computing system 115 may relinquish the information upon request by the entity. On the other hand, information or data assigned a higher level of security may require the information wallet computing system 115 to contact the user through the user computing device 120 and solicit authorization from the user. The authorization may be supplied by a number of ways, including, for example, an electronic signature, a pin number, a finger print, or direct user authorization through the user computing device 120. Security and/or validity of an information request is not exclusively "fixed." The informational wallet will have the capability to determine whether the "context of the transaction" is valid. Accordingly, if certain known patterns of fraud or trolling for information are detected the user may be alerted to the potential fraud or troll for data. Analytical models may be used to determine the probability of a valid or invalid data request.

As will also be appreciated, the security precautions taken in the context of a particular transaction may be determined not only based on the level of security associated with a particular information or data element, but also based on other factors, such as the identity of the entity requesting the information. For example, the user may configure the information wallet such that the user's spouse is granted access to all of the user's data, regardless of the level of security with which the data is associated. As another example, the information wallet may be configured such that the user's health care providers are given easier access to the user's health-related data, and the user's accountant is given easier access to the user's financial data. Hence, the user's approval may be prompted prior to the user's financial data being provided to the user's health care provider, but not prior to the user's financial data being provided to the user's accountant. Conversely, the user's approval may be prompted prior to the user's health-related data being provided to the user's accountant, but not prior to the user's health-related data being provided to the user's health care provider. As will be appreciated, the level of security provided may also be dependent on other factors, such as the time of day that the data is being requested (e.g., a request for data occurring in the middle of the night might be considered to be more likely to be fraudulent in some circumstances), the location of the requester (e.g., the IP address of the requester may indicate that the requester is overseas), the location of the user (e.g., the GPS signals from the user computing device 120 may indicate that the user is at a location that would not normally be associated with a request for health-related information), etc. As will be appreciated, heightened levels of security provided may also be provided in certain circumstances as a result of the operation of other fraud prevention algorithms (e.g., a pattern of requests for financial information may be identified as being unusual and therefore potentially fraudulent).

As discussed above, the action required to be taken by the user in order to approve such an information exchange may also be varied depending on the circumstances. For example, in some instances, approval may be passively granted based on the settings the user has set for their data (e.g., no affirmative action is required by the user to give the user's spouse access to the user's data). In other instances, affirmative action may be required to be taken on the part of the user. Again, the type of action may vary depending on the situation and the level of security to be provided. For example, in some instances, the approval may require the user to simply press a button labeled "approve" on the user computing device 120. In other instances, the approval may require the user entering a pin number or other secret password or code on the user computing device 120. As another example, biometric authentication, such as a body print, may be required. As will be appreciated, any number of different actions and different types of transactions may be required of a user in order to provide different levels of security in the context of particular information exchange transactions.

As will also be appreciated, in various embodiments, the information wallet system 100 may provide greater security than physical paper forms because the information is fully encrypted when exchanged and people do not have direct visual access to confidential data. The adapters on the entity computing systems 105 may provide an additional layer of protection by enforcing security settings of the information wallet computing system 115. In various embodiments, the information wallet system 100 may also provide enhanced security by providing an easier alternative to manually managing large amounts of password and authentication data. A user who is required to have a plurality of usernames and passwords for different accounts may feel compelled to catalog the plurality of passwords and associated websites on a hard copy for easy access. For example, a user may write down a list of passwords and keep the passwords within reach for easy reference, thereby impairing the security of the sensitive information. In one embodiment, after using the information wallet for over a period of time, the user may no longer have to remember a plurality of passwords for a plurality of websites or entities, etc. The user may self-authenticate using a combination of the identity of the device, biometric information acquired from the user by the user computing device 120, a single unified pin/password, or other identification methods.

In some embodiments, digital signatures may be used to certify the entity, the customer, the user, or the data. For example, driver's licenses typically contain information such as the date of birth, name, address, eye color, height, weight, donor status, etc., of the holder of the driver's license. Assuming data for the driver's license is obtained from an official government department, such as the department of motor vehicles for the state issuing the driver's license, the driver's license data may be digitally signed by the department of motor vehicles using standard certification technology. Hence, when this data is communicated to another entity computing system 105, the digital signature may be communicated with the data to certify that the data is accurate. Additionally, biometric information received from governmental authorities may be used to certify an entity, the customer, the user, or the data. For example, people are often required to submit to a background check for certain employment, which often requires going to a police station to obtain a set of fingerprints. The data collected at the police station may be used for certification and self-authentication purposes.

FIG. 2 is a diagram showing various ways in which the information wallet account (through an information wallet application 140) may be enriched with data. For example, data may be entered manually by the user via a keyboard or other suitable device. The user may enter information including a name, address, phone number, contacts, calendar, and other information. Also, image data may be received via a scanner, wherein scanned information may include, for example, a birth certificate, license, diploma, etc. Data may be received from smart devices such as cars, alarm clocks, medical devices, appliances, watches, phones, tablets, etc., and any "application" running on these devices. Biometric information may also be received, such as voiceprint, fingerprint, palm print, facial recognition information, etc. In some embodiments, the biometric information may be digitally signed either by a government agency, the entity that provides the cloud storage computing system 150 (e.g., a bank), or other trusted authority. In such embodiments, the information may then be used for biometric authentication. The data received from the smart devices may be stored. The data may be stored in a database. The data may be stored in standard predefined fields of the database or may be stored in customized fields as defined by the storing entity (e.g., in fields created by augmenting standard predefined fields). The data stored may be augmented with additional data or deleted data. Stored data may include metadata such as a time stamp or a version number. Data may be permanently stored unless a delete command is received from the user.

Data may be additionally received as an encrypted payload over email, USB drive, wired or wireless Internet, and so on. The encryption allows the information to be transferred safely without being accessed from an unauthorized party. The information wallet account may also receive information from the context of a transaction with a merchant or entity. This may include purchase transaction information of any type, including the price of an item, the selection of a gift, additional warranty information, receipt information, etc. The information wallet application 140 may download data from online sources, such as online account information, telephone information, invoices, etc.

The data from these and other sources may be used to enrich the information wallet and later made accessible to the entity computing systems 105 via the user computing devices 120.

FIG. 3 is a schematic diagram showing how the data collected in FIG. 2 can be published to various entities. As shown in FIG. 3, a user may share information with government entities, merchants, healthcare providers, employer, friends/family, and others. This information may be shared according to permissive authorizations and security levels as discussed above. FIG. 3 depicts the passive delivery of data wherein the user has configured data to publish to entities automatically, so that the user does not need to remember to publish the data. For example, if the user has a change of address, the updated address may be automatically transmitted to friends/family, employers, health care providers, merchants, the government, financial institutions, and so on. While FIG. 3 shows automatic sending of data (publishing), as will be appreciated, the information wallet system 100 may also be used for automatically receiving data (subscribing). For example, the user may subscribe to automatically receive data or messages regarding specific content from a specific entity computing systems 105. While some information may be configured to publish and subscribe automatically, other information may be configured to block automatically. For instance, the system may be configured to prevent publishing information to specific entities (i.e. credit card companies) or to block automatic subscriptions to certain entity publications (i.e. weekly e-newsletters).

Figure 4:
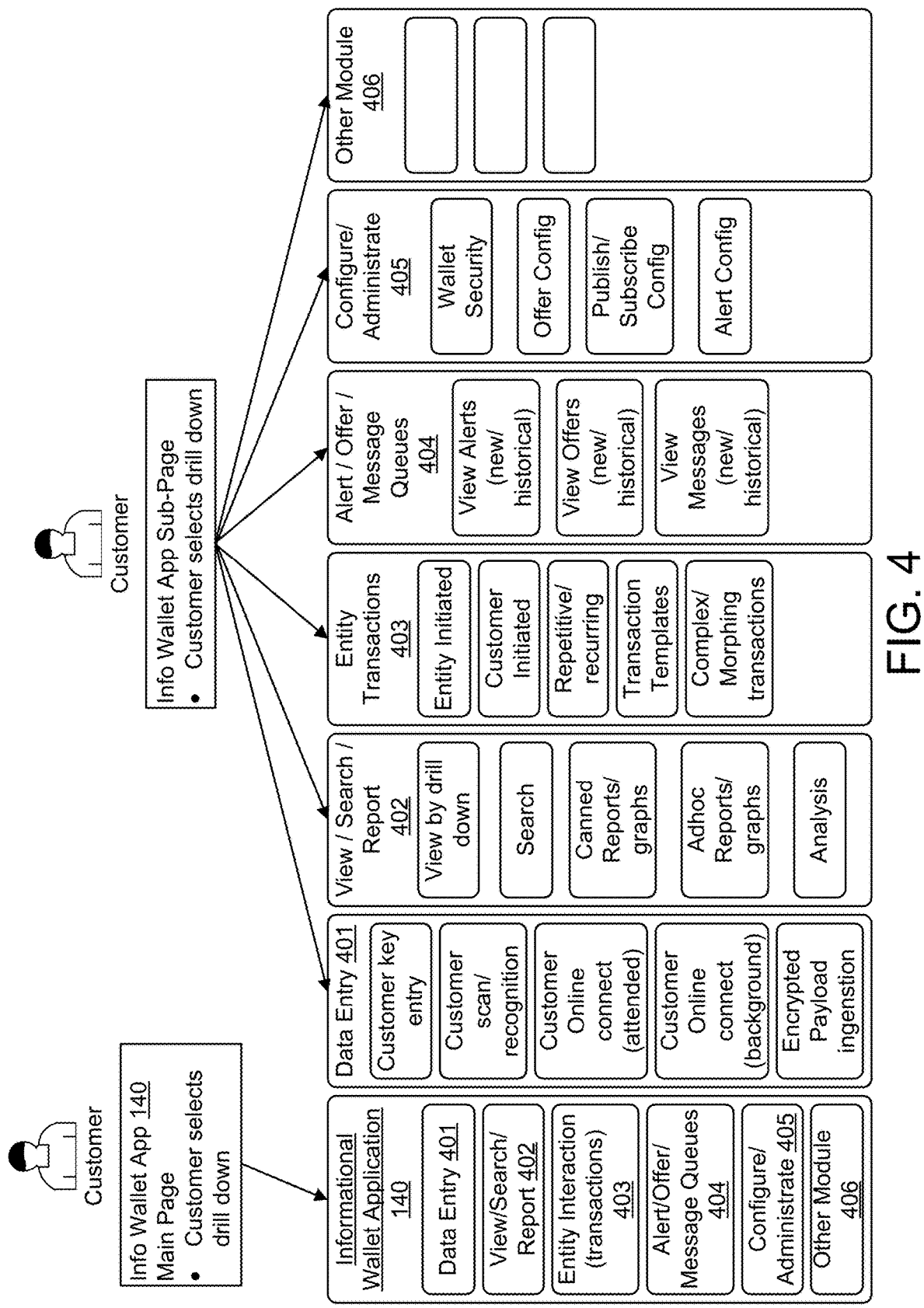
FIG. 4 is a schematic diagram of a computer-implemented information processing system from the information wallet system of FIG. 1. according to an example embodiment.

FIG. 4 is a schematic diagram showing tools provided to the user via a user information wallet application 140 operating on the user computing device 120 according to an exemplary embodiment. The tools shown in FIG. 4 provide the user with different ways of entering, updating, accessing and analyzing their data stored in the cloud storage computing system 150. As shown in FIG. 4, by way of a top-level menu level of the information wallet application 140, the user may be provided with data entry tools 401, view/search/report tools 402, entity interaction tools 403, alert/offer/message queue tools 404, configure/administrate tools 405, and other module tools 406. As shown in FIG. 4, by selecting one of the top-level menu items, the user may be taken to a drill down menu that provides further options. In one embodiment, the data entry tools 401 allow a user to enter information into the information wallet system 100 through the user computing device 120. The data may be gathered by typing information into a screen or by capturing the information via other methods, including but not limited to capturing images, a vocal recording, a video recording, etc. The data entry tool 401 may have a drill down menu that provides more functions for the application. In one embodiment, the data entry tool 401 drill down menu includes modules such as customer key entry, customer scan/recognition, customer online connect (attended) customer online connect (background), and encrypted payload module. Customer key entry and scan/recognition modules support the data and information gathering functions discussed above. The customer online connect modules, both attended and background, facilitate the functions of gathering the data and information from the customer and transferring the data and information to the cloud storage computing system 150. The encrypted payload module serves to encrypt the data prior to transferring the data from the user computing device 120 to the cloud storage computing system 150 of the information wallet computing system 115. Any of the modules and functional units discussed above or below may contain logic executable by a processor to achieve the described functions.

The view/search/report tool 402 may allow the customer or user to view, search, and retrieve information from the information wallet application 140. For example, a customer may want to view specific information that the customer previously entered into the system through the data entry tool 401. To retrieve the information, the customer may use the view/search/report tool 402 module to enter certain parameters. The backend portion of the information wallet application 140 may retrieve the data from the cloud storage computing system 150 according to the parameters entered by the customer and deliver the information to the user computing device 120. In one embodiment, the view/search/report tool 402 drill down menu includes modules such as view by drill down, search, canned reports/graphs, adhoc reports/graphs, and analysis. These modules allow functions described above to occur, such as searching for information using certain parameters. The view by drill down menu may allow any information that the customer desires to view to be displayed in a list, which further displays related information upon engaging the list. The modules also allow the information to be presented in an organized, useful manner through avenues including graphs and reports. The information, data, reports, and graphs may be used for any type of analysis or metric functions. The analysis module may support functions such as retrieving a list of data, retrieving details behind the data, listing aspects of the data with accompanying relevant information, and so on. Analytics that may be performed may include numerical calculations, metric evaluation, a summary or analysis of numeric data (such analysis including mean, average, standard deviation, percentages, comparison, likelihood), cost projections, and so on. The user can also install "applications" (commonly known as apps) that specifically provide reporting and/or analysis to the user based on data in the informational wallet. For example, an application may correlate driving habits, eating habits, and sleeping habits to health data (e.g., heart rate, blood pressure, oxygen saturation, etc.)

The entity transaction tool 403 allows the customer information wallet to interact with an entity through the information wallet system 100. In one embodiment, the entity transaction tool 403 drill down menu may include modules such as entity initiated, customer initiated, repetitive/recurring, transaction templates, and complex/morphing transactions. Through these modules, the customer may control how the customer interacts with the entity and how the entity is allowed to interact with the customer through the information wallet system 100. The entity initiated module allows a customer to control how entities initiate information requests or information transfers. The customer initiated module allows a customer to determine the manner in which it initiates transactions with an entity. For example, a customer may configure the information wallet application to solicit coupons for savings from specific entities. The repetitive/recurring module allows the customer to exact control on the interactions with the entities through the information wallet system 100 according to a specified period. For example, a customer may give recurring orders through the repetitive/recurring module (e.g. ordering medication every month). The transaction template module allows a customer to set a template on how information should be handled such that the transaction may easily occur in the future. Different entities may also have transaction templates, which could be transferred to the user computing device 120 and stored for easy use. The complex/morphing transactions facilitate transactions that are more complex than straight-forward transactions and change over time. These difficult transactions may involve greater manipulation and monitoring, and the complex/morphing transactions modules help facilitated those functions. The customer may be able to write rules that govern these complex transactions. For example, the user may specify a rule that indicates that the user is to be prompted to order medication if blood pressure went over a certain threshold within the month.

In one embodiment, the alert/offer/message queues tool 404 includes a drill down menu with modules including view alerts, view offers, and view messages. These modules assists in displaying alerts from activities, offers from entities, or messages from any computing system connected with the information wallet system. The displays, offers, or messages may be new or historical. In one embodiment, the configure/administrate tool 405 contains a drill down menu with modules such as wallet security, offer configuration, publish/subscribe configuration, and alert configuration. The wallet security module controls the security of the wallet. A customer may engage this module to edit the security settings of the wallet and of information shared from the wallet. For example, the security level for certain information may be assigned using the wallet security module. The offer configuration module allows a customer to control which offers it receives from entities. This module supports the function of blocking or allowing offers received by the information wallet. The publish/subscribe configuration controls the manner in which information from the customer's information wallet account may be shared with other entity computing systems 105. Any of the modules discussed throughout the disclosure may communicate or interact with other modules in order to fulfill the required functions. For example, the publish/subscribe configuration module may interact with the wallet security module to determine what information to publish and to which entity. In one embodiment, the publish/subscribe configuration module determines the information's level of security as set in the wallet security module, and then publishes the information according to the assigned security level. If information is set at a high level of security and requires a pin and thumbprint to publish, then the publish/subscribe configuration module may communicate with the wallet security module to enforce the pin and thumbprint requirement prior to publishing the information. The alert configuration modules allow a user to control when alerts may be given by the system. For example, a user may use the alert configuration module to set up an alert each time a user's social security number is solicited or shared. Other module tools 406 represent a plurality of modules that may facilitate the implementation of any desired function of the information wallet system.

FIG. 5 is a diagram showing information synchronization between various information wallet (IW) adapters 505 and a user computer device 120. Various adapters 505 may be developed to promote easy integration with business applications and systems, legacy systems, and so on. The adapters 505 may be used to enforce common data protocols and schemas. The adapters 505 may also be used to synchronize information traveling between, for example, entity computing systems 105 and the information wallet application 140 on a user computing device 120. As indicated in FIG. 5, different adapters 505 may be developed for different industries and tailored to meet specific industry needs. Adapters 505 may be developed for different software applications used by different types of businesses. Different data schemas may be developed for different domains (e.g., different industries). Again, the adapters within a common domain (e.g., healthcare) may use the same schemas to promote common data protocols and schemas. In various embodiments, the adapters may utilize both standard and non-standard schemas. For example, an entity may be permitted to add/change/delete any data element with the approval of the user. Those data elements can be "standard" within a domain or completely custom within a domain. In addition, an entity may be permitted to add a custom extension to an existing data element that is either standard or custom. In all cases the adds/changes/deletes may be versioned and saved so that the full data picture is preserved. In some situations, destructive deletes may be permitted with the approval or at the request of the user. Adapters 505 may also enforce security standards of the entity computing systems and information transferring between the computing systems of the information wallet system 100.

Figure 6:
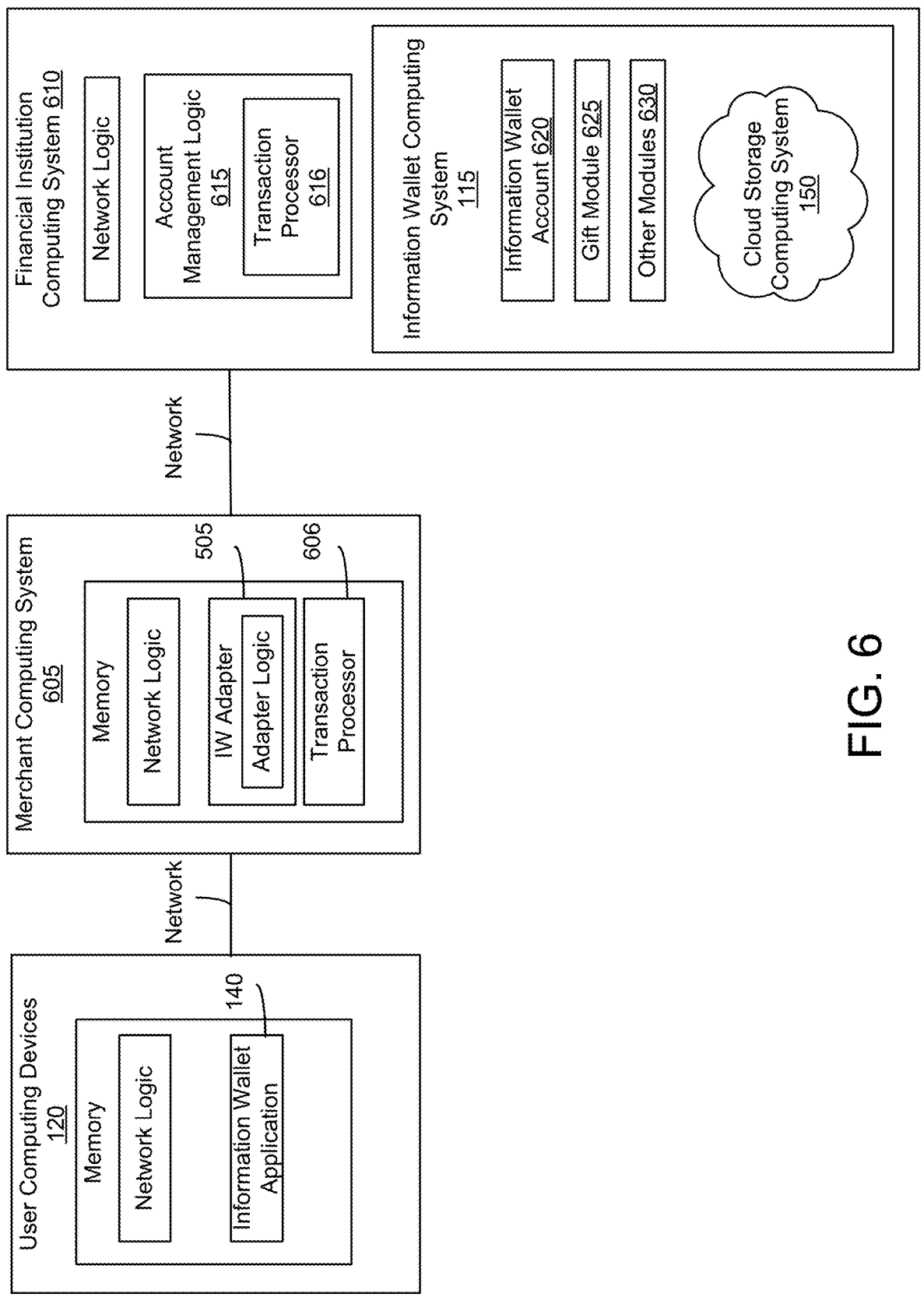
FIG. 6 is a schematic diagram of an information wallet system that may be implemented to deliver a gift according to an example embodiment.

FIG. 6 is a schematic diagram of an information wallet system 100 that may be implemented to deliver a gift according to an example embodiment. The user computing device 120 may be a device such as a laptop, mobile phone, desktop, tablet, electronic gaming device, portable digital device, interactive television, or any similar device. The user computing device 120 may contain an information wallet application 140. The information wallet application 140 may comprise computer software with executable code and may be downloaded and installed on a user computing device 120. The information wallet application 140 may be configured to run on any operating system and may allow secure access to the information wallet computing system 115.

In one embodiment, the information wallet computing system 115 is maintained within a financial institution computing system 610, which may be maintained by a financial institution (e.g., a bank). The financial institution computing system 610 accepts the information deposited into the information wallet system 100 and holds the information in the cloud storage computing system 150. The information wallet application 140 on the user computing device 120 may be configured to communicate with a plurality of information wallet adapters 505 contained within other computing systems. In one embodiment, the user computing device 120 communicates with an information wallet adapter 505 contained within a merchant computing system 605. There may be a plurality of information wallet adapters disposed on a plurality of computing systems that may allow communications between user computing devices 120 and merchant computing systems 605 through the information wallet system 100. The information wallet adapters 505 may be configured to interact securely with each other and with the information wallet computing system 115.

In one embodiment, the information wallet adapters 505 act as secure portals in which information is sent and received between computing systems. The adapters 505 may be installed on the merchant computing system 605 to integrate the merchant computing system 605 and user computer device 120 with the information wallet computing system 115 operated by the financial institution computing system 610. The information wallet adapter 505 of the merchant computing system 605 may also have configuration unique to a specific merchant, such as configuration to solicit certain types of information, deposit certain types of information, generate offers and coupons with a purchase, deposit or redeem specific items, etc. The unique configuration may be written into executable code in the adapter logic and executed by the processor of the merchant computing system 605. The user computing device 120 may also contain logic, which may allow the user computing device 120 to connect with and operate with the merchant computing system 605 and the financial institution computing system 610 through the information wallet system 100. The logic may also be executed by a processor and may allow the user devices and systems, as well as merchant devices and systems, to implement a number of functions, including all functions described within the disclosure.

The information wallet adapter 505 on the merchant computing system 605 may allow the system to integrate into the information wallet system 100 without having to perform a full overhaul of the merchant computing system 605. The information wallet adapters 505 may also provide a compartmentalized method of adapting the merchant computing system 605 to the information wallet system 100, which may further allow greater ease in transitioning, implementing, and using the system. In one embodiment, the information wallet adapters 505 are configured to communicate with entities and perform functions such as synchronizing information, integrating technologies, and enforcing the security procedures set by a user or a computing system.

The user computing device 120 may communicate with a merchant computing system 605 over a network. The user computing device 120 may transfer information from the information wallet account 620 and the merchant computing system 605 may receive the information through its information wallet adapter 505. In one embodiment, the user computing device 120 interacts with the merchant computing system 605 to make a purchase through a platform of the merchant computing system 605, such as a website or online/off-line page displaying a catalog of items for purchase. The merchant computing system 605 may receive purchase transaction information sent from the user computing device 120 to complete the purchase, and the merchant computing system 605 may employ a transaction processor 606 to complete the transaction. The transaction processor 606 may be configured to process a plurality of transactions or apply processing functions that may be implemented through the merchant computing system 605. The transactions and operating functions may include item purchases, payment processing (including credit cards, gift cards, and other fund accounts), refunds, purchase redemptions, etc. The transaction processor 606 may be configured to process functions according to the specific needs of any given merchant.

The merchant computing system 605 may be configured to communicate with a financial institution computing system 610. The merchant computing system 605 may communicate with the financial institution computing system 610 through an information wallet adapter 505. In one embodiment, the financial institution computing system 610 may be a computing system of a bank. The financial institution computing system 610 may receive information from the merchant computing system 605 and store the information in a cloud storage computing system 150. The information that the financial institution computing system 610 receives may include purchase transaction information.

Purchase transaction information discussed throughout the disclosure may comprise a variety of information including a gift, which the recipient's information wallet account 620 stores at the financial institution over a period of time for redemption or re-gifting. The gift may be redeemed by accessing an information wallet account 620, retrieving the stored gift, and delivering the gift to a third-party computing system (i.e., merchant computing system 605) through the information wallet computing system 115. The third-party computing system may be a merchant computing system 605, and an operator of the merchant computing system 605 may redeem the gift upon request. Purchase transaction information may also comprise warranty and insurance information held over a period of time. Several types of warranties may be included in purchase transaction information, including merchant and store-specific warranties, manufacturer warranties, credit card warranties, extended warranties, additional warranties for purchase, implied warranties, express warranties, etc. The system may allow a user to access the warranty and insurance information to track and utilize a merchant warranty or insurance policy. The system may also be configured to assist a user with automatically registering for a warranties or insurance policies offered by a merchant using information deposited into a user's information wallet account 620. The merchant computer system 605 may offer additional warranties or insurance policies to the recipient of a gift based on information published to the merchant through the information wallet computing system 115.

Purchase transaction information may also comprise tax information held over a period of time, which may allow a user to access stored tax information to aid in completing tax forms. A merchant computing system 605 may deposit tax related information into an information wallet account 620 relating to a gift. For example, the merchant computing system 605 may deposit an itemized receipt for purchases made or gifts received by an information wallet account 620 belonging to a nonprofit organization. Also, a tax payer who makes purchases that may qualify for favorable tax treatment (e.g., deductible business expenses) may also utilize the information deposited into information wallet account 620 by the merchant.

In one example embodiment, purchase transaction information may include return policy information to inform a user of the return policy and other related policies of the merchant and to aid merchants in publishing their policies for business operation purposes. The deposited information may be transferred, held, and updated as needed. A deposit of the information allows for a secure and convenient method of disseminating important information. Published return policies may also allow both a merchant and a customer to avoid conflict stemming from misplaced expectations of whether, for example, a gift may be returned or exchanged.

Purchase transaction information may also comprise information including product specifications, product identifying information, receipts, and transaction details held over a period of time. This may allow a user to refer to the information at a later date for purposes including avoiding the inadvertent purchase of the same product, accessing accurate measurements or features of a product, purchasing complimentary products, showing proof of ownership of a product, etc. This type of purchase transaction information may also allow a user to extract the most value and utility from a gift deposited into an information wallet account 620.

The information wallet account 620 may hold the purchase transaction information over a period of time. This period of time may be specified by the user, a recipient, a merchant computing system 605, or a financial institution computing system 610. In one example, a user may deposit a seasonal specialty gift for a recipient. Upon the end of the season, a user may direct the gift to be returned if the gift is not redeemed during a specified time. In another example, a merchant computing system 605 may deposit warranty information that lasts for a specific amount of time (e.g., one year). Upon the exhaustion of the time period, the merchant computing system 605 may configure the information to expire. The information wallet account 620 may also be configured to track different types of warranties over time, such as merchant and store-specific warranties, manufacturer warranties, credit card warranties, extended warranties, additional warranties for purchase, implied warranties, express warranties, etc., as previously indicated. For example, a user may experience a defect with an electronic item received as a gift after having the electronic item for 6 months. The electronic item may be covered by a manufacturer warranty that lasts 12 months, and the warranty information may be stored in the information wallet account 620. After discovering the defect, the user may access the manufacturer warranty information stored in the information wallet account 620 to have the defected electronic item repaired or replaced according to the warranty policy.

In an example embodiment, the information wallet computing system 115 may be configured to determine and transfer to third-party computing systems suggestions of information to deposit into the information wallet account 620. The information wallet computing system 115 may base the suggestions on previous information deposited into the systems, previous purchases made from related accounts held by the recipient at the financial institution, pairing information received from a plurality of third-party computing systems, etc. The systems may also be configured to update the information that is placed within the information wallet account 620. For example, if a user gives a recipient a gift, and the gift is later recalled or discovered to contain defects, then the information wallet computing system 115 may be configured to communicate with a merchant computing system 605 and update the information as needed. The disclosed systems may also be configured to provide updates, notifications, or alerts concerning the occurrence of an event, such as the arrival of additional stock of a particular product.

The financial institution computing system 610 may comprise account management logic 615, a transaction processor 616, and an information wallet computing system 115. The account management logic 615 may be configured to manage accounts maintained by the financial institution, which may include financial accounts (i.e. bank accounts) or information wallet accounts belonging to a plurality of users. The transaction processor 616 may be configured to aid the financial institution in the execution of processing transactions on a daily basis. For example, the transaction processor 616 may be configured to permit users to perform transactions using funds, including funds from a bank account held by a user. The transactions may include depositing funds (i.e. cash, check, ACH, direct deposit) into a bank account, retrieving and transferring funds to a bank account, cashing checks, creating bank accounts, closing bank accounts, charging off bank accounts, exchanging currency, etc. Transactions may also involve depositing gifts into information wallet accounts 620, transferring gifts to separate information wallet accounts 620, and redeeming gifts from information wallet accounts 620.

The information wallet computing system 115 may include an information wallet account 620, a gift module 625, other modules 630, and a cloud storage computing system 150. The information wallet account 620 may be configured to interact with the cloud storage computing system 150 to facilitate depositing information related to a user, person, company, or entity. A plurality of users, companies, or entities may own a plurality of information wallet accounts 620. The information wallet account 620 may be accessed on the front end by a user through an information wallet application 140 on a user computing device 120 to view data concerning the information wallet account 620, including listings and statistics of information deposited into the account. The information wallet account 620 may also facilitate the control of settings for the information wallet account 620. The gift module 625 may allow the electronic interaction (i.e. giving, delivering, and redeeming) of the process of giving gifts with an information wallet computing system 115. The gift module 625 may be accessed to view stored gifts within the wallet. The gift module 625 may also be configured to allow a recipient to redeem a gift through a merchant computing system 605 or transfer the gift to a second recipient having an information wallet account 620. The second recipient's information wallet account 620 may be maintained by the same financial institution maintaining the first recipient's information wallet account. Also, the second recipient's information wallet account 620 may be maintained by a separate entity. In one embodiment, a recipient of the re-gifted gift may not have an information wallet account 620 at any entity but instead may have a traditional financial account with a financial institution. The other modules 630 may allow for a plurality of any type of executable code to complete any desired function using the information wallet computing system 115.

Figure 7:
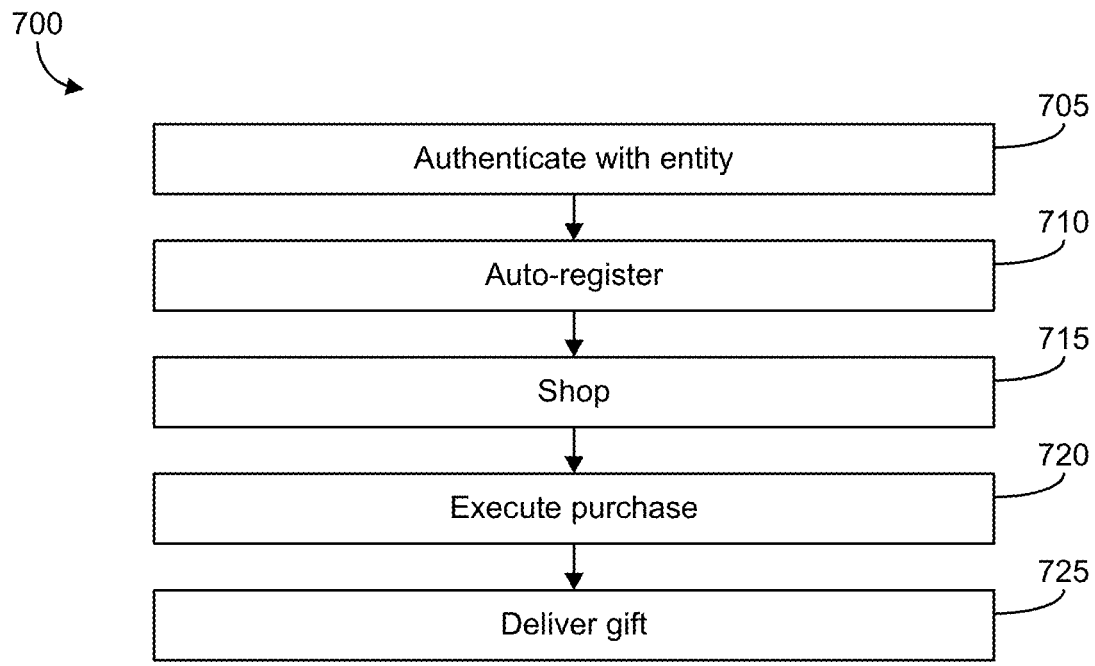
FIG. 7 is a flow diagram of a process of giving a gift according to an example embodiment.

FIG. 7 is a flow diagram of a process of giving a gift according to an example embodiment. The user computing device 120 may connect with a merchant computing system 605 and authenticate the merchant (705). The authentication process may ensure that the merchant is connected to the information wallet computing system 115 through information wallet adapters 505 and may ensure the safety of transacting with the merchant. The authentication process may also serve to ensure that the user initiating the transaction is an authorized user or owner of an account with which a merchant computing system 605 interacts. The merchant computing system 605 may be any entity computing system 105.

The system may be configured to automatically register the user computing device 120 (710). The automatic registration may allow for quicker service on future interactions. The automatic registration may be configured to execute based upon preference selection of a user through the user computing device 120. The registration information, for example, may be extracted from an information wallet account 620 of a user to complete the registration process. Upon obtaining a secure connection to a merchant computing system 605 adapted to the information wallet computing system 115, a user may proceed to shop for an item on, for example, a website operated by a merchant computing system 605 (715). A merchant computing system 605 may offer an array items for purchase, including goods, services, gift cards, item credits, music, media, images, virtual items, etc. Once a user chooses an item to purchase, the user may execute the purchase with the merchant (720). The purchase may be transacted according to any policy followed by a merchant. For example, a merchant may complete a purchase transaction from the exchange of electronic funds, cash, gift cards, store credit, coupons, etc.

A user may then arrange to have the gift delivered to a recipient (725). In one embodiment, the user may deliver the gift to a recipient information wallet account 620 through the user computing device 120. A user may be connected to other users of the information wallet system 100 through, for example, connection mechanism that allows users to become friends of each other. Information wallet users who are friends may be able to receive specific information about the user, such as telephone, email, address, birthday, preferences, previous purchases, previous gifts, wish lists, favorite lists, etc. A user may be able to configure the information wallet account 620 to publish the information a specific user wishes to share with friended users, such as address updates.

The information may be published to the information wallet accounts of the friended users, e.g., a contacts list of each of the friend users may automatically update based on the published information. Upon purchasing an item, a user may choose a friended user as the recipient of the gift. To send the item, the user may select the friended user using a prompt, screen, typed text, icon, or any mechanism configured to allow a friended user to be chosen as a gift recipient. The information wallet account 620 may be configured to automatically update relevant contact information (e.g., based on information published by the recipient to friends through the information wallet computing system 115) to ensure a gift is delivered to the correct recipient. For example, the information wallet computing system 115 may be configured to automatically update physical addresses, email addresses, phone numbers, name changes, etc.

In one example, a user may wish to shop for a friended user who has a bridal or other gift registry through the information wallet system 100. The bridal registry through the information wallet system 100 may allow a friended user to list items to be purchased generally or through numerous merchants connected to the information wallet system 100. Hence, the information wallet system 100 may track gifts from various merchants, without requiring the user to register at a single/specific merchant. A friended user may also configure the friended user's information wallet account 620 to publish the list so that users may be able to sort gifts, search gifts, organize gifts, select gifts, group gifts, etc. In another embodiment, a user may request that the gift be mailed to a recipient's stored home address in the information wallet. In another embodiment, the user may ask the merchant to deliver gifts according to a recipient's stored preferred method of receiving gifts, where the preferred method may be stored in the information wallet and a user may have access to that method through a friend connection.

In one embodiment, the information wallet computing system 115 may be configured to display gift information along with other redeemable items. For example, the financial institution computing system 610 may offer users reward points or credits for specific purchases or actions, such as use of a credit card issued by the financial institution. The reward points or credits may be accumulated to reach a certain value and redeem for certain items offered by the financial institution. A user of the information wallet may be enrolled in a plurality of reward programs offered by different entities, such as credit card companies or merchants, or may have merchant-specific rewards obtained via utilization of the credit card issued by the financial institution. The information wallet may be configured to hold and display all reward points or credits from different entities offering a reward program (e.g., credit card company, financial institution, merchants, online shopping portals, etc.). The display of the rewards points information along with the gift information may allow a user to combine or exchange redeemable points and gifts to acquire an item a user would like. For example, a user may be able to combine a gift certificate with reward points from the financial institution to purchase an item from a merchant. In another example, a user who receives a toaster as a gift may be able to combine the value of the toaster with rewards points from a credit card company and/or other merchant-specific offers to exchange the toaster for a television through the information wallet application 140. As another example, a user who receives a gift redeemable from merchant A, but who does not typically shop at merchant A, may pass the gift along to another user that more typically shops at merchant A. The second user may redeem the item through merchant A or may exchange the gift for another item. In exchanging the gift for the second item, the second user may also combine the value of the gift with any rewards points or other offers available to the second user for merchant A through the financial institution computing system 610.

Figure 8:
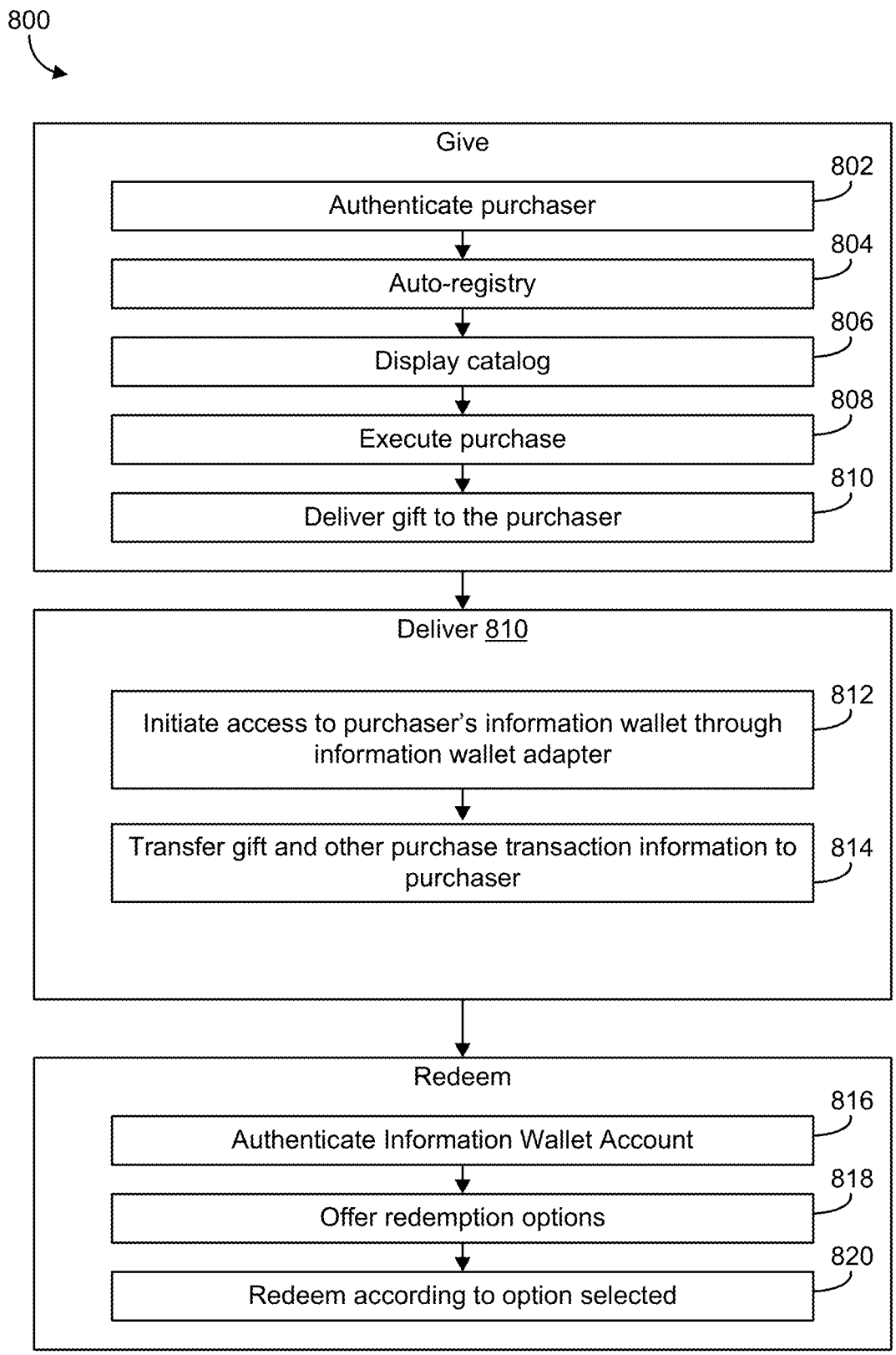
FIG. 8 is a flow diagram of a process of delivering a gift and redeeming a gift according to an example embodiment.

Referring to FIG. 8, a flow diagram of a process of delivering a gift and redeeming a gift according to an example embodiment is shown. During the process of giving a gift, the merchant computing system 605 may authenticate a purchaser (802). The authentication may allow the merchant computing system 605 to prevent fraud by verifying the identity of the user. The authentication process may also ensure that the entity or merchant is connected with the information wallet computing system 115 through information wallet adapters 505 and may ensure the safety of completing transactions. The authentication process may additionally serve to authenticate that the user initiating the transaction is an authorized user or owner of an account with which a merchant computing system 605 interacts.

The merchant computing system 605 may be configured to automatically register the user computing device 120 in its system (804). This process of automatic registration may allow the merchant computing system 605 to use information stored in an information wallet account 620 to register the user computing device 120 and may relieve or eliminate that user's need to enter a large amount of data. The merchant computing system 605 may display a catalog of items to a user to purchase items (806). The merchant computing system 605 may offer an array items for purchase, including goods, services, gift cards, item credits, music, media, images, virtual items, etc. Once a user chooses an item to purchase, the merchant may receive a form of payment from a user and execute the purchase in its system (808). The purchase may be executed online through a merchant computing system 605 or at a brick-and-mortar location. The purchase may be transacted according to any policy followed by a merchant. For example, a merchant may allow purchase transactions to be completed by the exchange of electronic funds, cash, gift cards, store credit, coupons, etc. Following the purchase, a user may identify a method of delivery, which the merchant should use to deliver the gift to a recipient. For example, a user may direct a merchant to deliver a gift to a recipient by depositing the gift into a recipient's information wallet account 620. The recipient may be a third party or the user. In one embodiment, the recipient is a third party and has an information wallet account 620 through a financial institution computing system 610. The user may direct the merchant computing system 605 to deposit a gift into the information wallet account 620 of a recipient. Upon receiving the delivery instructions, the merchant computing system 605 may be configured to deliver the gift to the purchaser (810). The purchaser may receive the gift through the purchaser's information wallet account 620, which may allow the purchaser to transfer the gift to a friended user who also has an information wallet account 620.

In one example embodiment, the process of delivering a gift may involve initiating access to a purchaser's information wallet account 620 through an information wallet adapter 505 within a merchant computing system 605 (812). Initiating access to the purchaser's information wallet account 620 may involve the merchant computing system 605 sending a non-transitory computer readable signal to the user computing device 120 or the information wallet computing system 115. The merchant may send the signal through the information wallet adapter 505 by engaging code within the merchant computing system 605 configured to send the signal. The information wallet adapter 505 may contain a module configured to send the signal, or the transaction processor 606 within the merchant computing system 605 may be configured to send the signal. In one embodiment, access is initiated through the information wallet application 140 on a user computing device 120 when the user directs the merchant deposit the gift into the user's (purchaser's) information wallet account 620.

In one embodiment, the merchant computing system 605 may transfer a gift and other purchase transaction information to the purchaser through the information wallet account 620 (814). The transferring of this information may also be carried out through the information wallet adapters 505. The merchant computing system 605 may also utilize the information wallet adapters 505 to transfer the information by executing coded logic configured to implement the transfer. In one example embodiment, the process of redeeming a gift may include authentication of an information wallet account 620 (816). The identity of an information wallet may be authenticated based on a number of factors, including name, the account number, a pin or password, a confirmation number, knowledge of information regarding the deposit of the gift, presenting identification proof, etc. The authentication may ensure that the intended recipient is redeeming the intended gift.

The merchant computing system 605 may be configured to offer redemption options to a recipient (818). The redemption options may allow a user to obtain the actual physical item corresponding to the electronic representation of the item deposited into an information wallet account. One option may allow the recipient to request that the merchant deliver the gift to a specified address. In another example, the recipient may request to redeem the item at a brick and mortar location. After the recipient selects a redemption method, the merchant computing system 605 may redeem the gift according to the option selected by the recipient (820). In addition to utilizing the options above, a recipient may choose other actions for the gift, including holding the gift in the wallet, swapping the gift for another item or cash if allowed, re-gifting the gift, etc.

Figure 9:
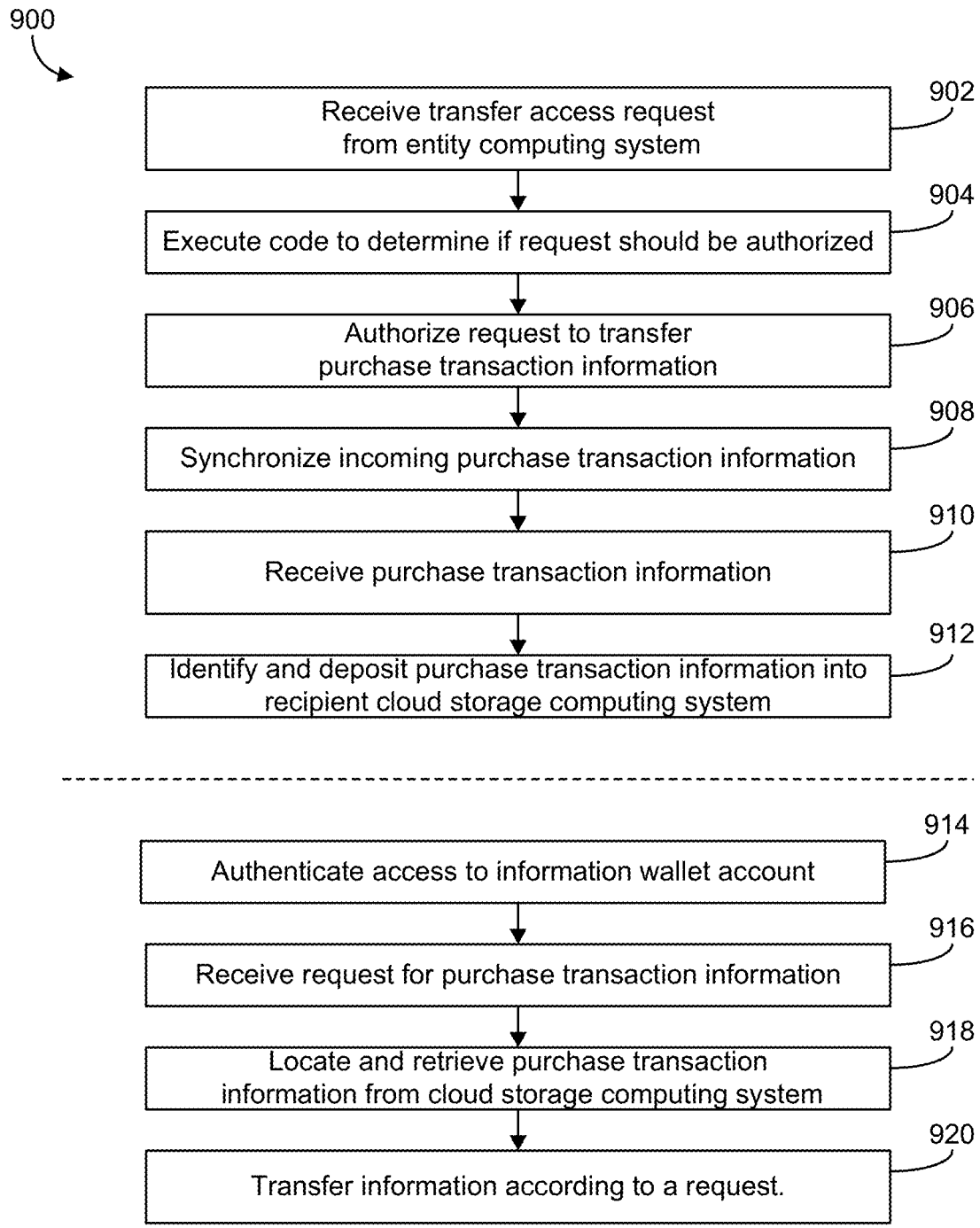
FIG. 9 is a flow diagram of a process of receiving a gift into an information wallet computing system according to an example embodiment.

FIG. 9 is a flow diagram of a process receiving a gift into an information wallet computing system according to an example embodiment. In one example embodiment, this process is implemented by a financial institution computing system 610. The system may receive a transfer access request from an entity computing system (i.e. merchant computing system 605) (902). The merchant computing system 605 may seek to initiate access to the a user's information wallet to deposit the gift. In one embodiment, the merchant computing system 605 accesses the information wallet account 620 securely through the information wallet adapters and deposits the gift directly into a user's information wallet account. In another embodiment, the merchant computing system 605 transfers the gift to the financial institution computing system 610, and the financial institution computing system 610 deposits the gift into the recipient's information wallet.

In one embodiment, the information wallet computing system 115 may contain code to examine whether the transfer request should be authorized (904). The information wallet computing system 115 may consult user preferences in making the determination as well as virus and security safeguards within the system. Each system may have differing requirements. Upon meeting the requirements of a particular entity, the system may authorize the request to transfer purchase transaction information (906). The system may be configured to execute code imbedded within the system that authorizes the requests to transfer purchase transaction information. The system may synchronize incoming purchase transaction information (908). The purchase transaction information may be synchronized between a merchant computing system and a financial institution computing system so that information may be transferred securely and accurately between the systems. Information wallet adapters 505 aid in synchronizing the information as well as the information wallet computing system 115.

In one embodiment, the system may receive purchase transaction information (910). The purchase transaction information may be received from a merchant computing system 605 or a user computing device 120, and the merchant computing system 605 may send purchase transaction information through secure information wallet adapters 505. The system may also be configured to identify and deposit purchase transaction information into the cloud storage computing system (912). The cloud storage computing system 150 may file the information according to parameters such as account number, account holder name, type of purchase information, date of deposit, security levels, etc. The cloud storage computing system 150 may also communicate with systems that provide access to the information wallet account 620 and hold the purchase transaction information over a period of time. For example, a purchaser may purchase any number of gifts from any number of merchants, and the purchaser may virtually distribute each gift purchased to any number of recipients, who may then redeem the gifts. For instance, Person A may purchase a music device either at a merchant's brick and mortar location or through a merchant's website. The music device may be deposited into Person A's information wallet account 620, and Person A may send the music device from Person A's information wallet account 620 to Person B along with a note. Person B may receive the music device through a variety of avenues, including but not limited to through Person B's own information wallet, email, text message, voice message, the merchant computing system 605, etc. Person B may then walk into any merchant location and redeem the music device. The location of Person A and Person B does not limit the transfer, receipt, or redemption of the purchase transaction including gifts. Person A and Person B may be present in different states, or even in different countries. Also, the exchange of gifts using the mechanisms described throughout may also occur between any combination or number of individuals, companies, organizations, etc.

To assist in redeeming the gift, the financial institution computing system 610 may authenticate a merchant computer system's 605 access to an information wallet account 620 (914). The authentication may ensure that an authorized merchant is accessing the information wallet account 620 for an authorized purpose, such as to retrieve a stored gift for redemption as ordered by a purchaser or recipient. Following the authentication, the system may receive the request to obtain purchase transaction information (916). The request may be received from a merchant computing system 605 sending the purchase transaction information through information wallet adapters 505. The system may be configured to locate and retrieve the purchase transaction information from the cloud storage computing system 150 (918). The cloud storage computing system 150 may be configured to locate information based at least in part on the storage parameters as mentioned above. These parameters may include account numbers, account holder names, types of purchase information, dates of deposit, security levels, etc. After finding the desired purchase transaction information, the cloud storage computing system 150 may be configured to retrieve the information. The system may also transfer the information according to a request. For example, a user or recipient may request the information to be sent to the merchant computing system 605. Any part of the system, including the financial institution computing system 610, information wallet computing system 115, etc. may be configured to transfer the purchase transaction information.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design gift operating conditions and arrangement of the embodiments without departing from the scope of the present invention.

What is claimed is:

1. A method, comprising:
connecting, by one or more processors of a wallet computing system, with a plurality of third-party computing systems having wallet adapters;
establishing, by the one or more processors, responsive to a request, security settings for purchase transactions stored at a cloud computing system, the security settings comprising at least two levels of security;
receiving, by the one or more processors, transaction information into the wallet computing system, the transaction information being transmitted from a wallet adapter located within a third-party computing system of the plurality of third-party computing systems;
storing, by the one or more processors, the transaction information in a cloud storage computing system configured to manage the transaction information, receive the transaction information and enforce the security settings with respect to the transaction information being transferred in and out of the cloud storage computing system, respective portions of the transaction information stored according to the at least two levels of security established in the security settings, wherein the transaction information comprises a gift; and
depositing, by the one or more processors, the transaction information into a wallet account of a recipient maintained by the cloud storage computing system, the wallet account storing the transaction information over a period of time for the gift to be redeemed at a location corresponding to the third-party computing system.

2. The method of claim 1, wherein receiving the transaction information comprises:
receiving, by the one or more processors, a request to transfer the transaction information into the wallet computing system from the wallet adapter located within the third-party computing system; and
transferring, by the one or more processors, responsive to authorizing the request, the transaction information into the wallet computing system from the wallet adapter located within the third-party computing system.

3. The method of claim 2, further comprising synchronizing, by the one or more processors, responsive to transferring the transaction information, the transaction information with the third-party computing system.

4. The method of claim 1, further comprising:
receiving, by the one or more processors, from the third-party computing system, a request to modify the gift based on the recipient; and
modifying, by the one or more processors, responsive to the request, the gift included in the transaction information based on the recipient.

5. The method of claim 1, transmitting, by the one or more processors, after the period of time, the gift from the wallet account of the recipient to the wallet adapter located within the third-party computing system.

6. The method of claim 1, wherein the gift is a first gift and wherein the transaction information is a first transaction information, and further comprising combining, by the one or more processors, responsive to a request from the third-party computing system, the first gift with a second gift included in a second transaction information received from the wallet computing system.

7. The method of claim 1, further comprising:
receiving, by the one or more processors, into the wallet computing system, a request from the third-party computing system to retrieve the transaction information from the wallet account;
retrieving, by the one or more processors, responsive to the request, the transaction information from the cloud storage computing system; and
transmitting, by the one or more processors, from the wallet computing system, the transaction information to the third-party computing system, the third-party computing system receiving the transaction information through the wallet adapter.

8. The method of claim 7, wherein the gift is delivered to a financial institution computing system at the request of a buyer who deposits the gift into the wallet account of the recipient held at the financial institution computing system, the gift being held over the period of time for redemption.

9. The method of claim 7, wherein retrieving the transaction information from the cloud storage computing system comprises:
authorizing, by the one or more processors, based on the security settings, the request to retrieve the transaction information to the cloud storage computing system; and
retrieving, by the one or more processors, responsive to authorizing the request, the transaction information from the cloud storage computing system.

10. The method of claim 7, wherein delivering the transaction information to the third-party computing system comprises:
receiving, by the one or more processors, from the third-party computing system, a redemption option for the gift; and
transmitting, by the one or more processors, via the wallet computing system, based on the redemption option for the gift, the transaction information to the third-party computing system, the third-party computing system receiving the transaction information through the wallet adapter.

11. The method of claim 1, further comprising transmitting, by the one or more processors, requests to the third-party computing system for information to deposit into a financial institution computing system, the financial institution computing system basing the requests on previous transactions made from related accounts held by the recipient at the financial institution computing system, and pairing information received from the third-party computing system.

* * * * *